Nov. 17, 1953 W. S. ELLIOTT 2,659,828

LIGHT BEAM STABILIZING SYSTEM

Filed Jan. 3, 1950

2 Sheets-Sheet 1

Inventor
William Sidney Elliott

By Flocks and Simon
Attorneys.

Nov. 17, 1953 W. S. ELLIOTT 2,659,828

LIGHT BEAM STABILIZING SYSTEM

Filed Jan. 3, 1950 2 Sheets-Sheet 2

Inventor
William Sidney Elliott
By Flocks and Simon
Attorneys

UNITED STATES PATENT OFFICE 2,659,828

LIGHT BEAM STABILIZING SYSTEM

William S. Elliott, Borehamwood, England

Application January 3, 1950, Serial No. 136,586
Claims priority, application Great Britain January 3, 1949
3 Claims. (Cl. 250—201)

This invention concerns the stabilising of light beams, and has for an object to provide means whereby a light beam can be accurately directed on to a target so as to remain in a predetermined position or trace a predetermined path thereon regardless of any random displacement of the light source due, say, to shock or vibration, or of any regular displacement due to deliberate physical deflection.

The present invention aims at solving this problem by causing the beam of light, or a part thereof, to impinge on a light sensitive device, by interposing means for causing the degree of illumination of the light sensitive device to vary in accordance with the extent of any deviation of the beam from a predetermined position, and by utilising the response of the said device to exert a correcting control on the light source in the sense for restoring the light beam to its predetermined position.

Apparatus according to the invention for stabilising the position of a light beam comprises a light sensitive control device to be illuminated by the beam, means associated with the said control device for defining a predetermined position of the beam with respect thereto and for effecting a variation in the degree of illumination thereof in accordance with any departure of the beam from its predetermined position, and means controlled by the light sensitive device for displacing the source of the beam of light in the sense for restoring it to its predetermined position.

The invention has a particularly advantageous application to data transmission systems of the kind such as are described, for example, in the specification of the prior United States patent application Serial No. 70,764, filed January 13, 1949, for Data Transmission Systems for Digital Calculating Machines or the Like, and in which information to be utilised is represented in digital form. In the apparatus described in the said prior patent specification, a disc or other movable target is provided with a series of discrete markings—for example, dots or dashes—which represent, in digital form, functions of the position of the target with respect to a predetermined datum. The pattern of these markings is scanned along a predetermined line by a beam of light generated on the fluorescent screen of a cathode ray tube, and the resultant output from an optical pick-up device, such as a photocell which is irradiated by the modulated light beam, is used to control other apparatus such as a remote position indicator or a follow-up servo mechanism for repeating the movements of the target. It is essential, in such an arrangement, that the scanning light beam should not deviate unintentionally from the predetermined scan line during each scan, since such deviation would introduce a material error into the signals derived from the pick-up device. Such deviations may, for example, be produced by mechanical shock or vibration in the apparatus, or by instabilities in the circuit controlling the deflection of the spot on the screen of the cathode ray tube.

Various embodiments of the invention will now be described, by way of example only, with reference to the accompanying drawings in which.

Throughout the drawings, like parts carry like reference numerals.

Figures 1, 2, 3, 4:
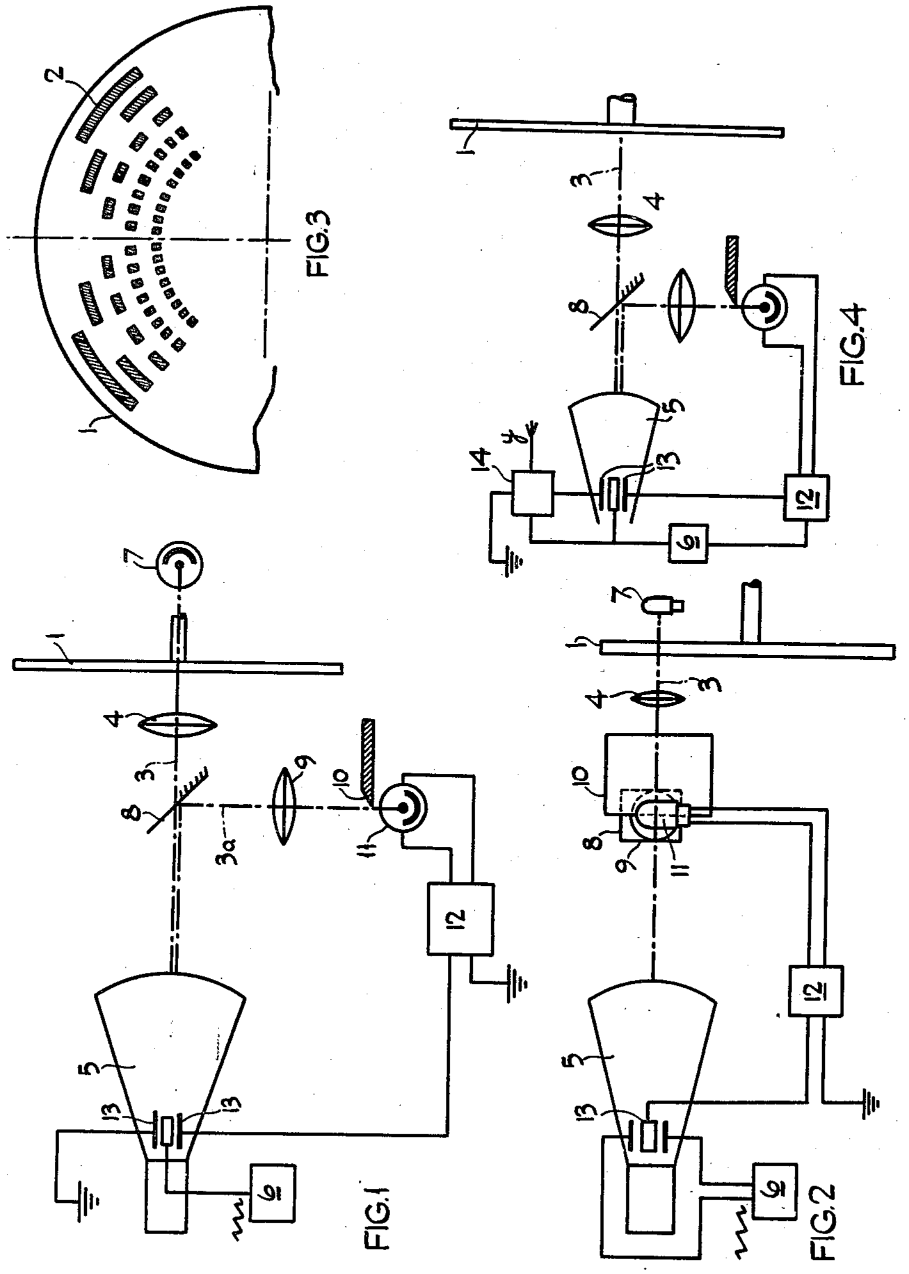
Fig. 1 is a schematic layout of a first embodiment of the invention, seen in plan view.
Fig. 2 is a side elevation seen in the direction of the arrow II of Fig. 1.
Fig. 3 is a fragmentary front view of a binary system function disc.
Figs. 4 and 5 are schematic layouts of alternative embodiments of the invention.

Referring first to Figs. 1, 2, and 3, a target in the form of a rotating disc 1 carries radial markings (indicated at 2 in Fig. 3) which represent, on the binary scale, the angular position of the disc 1 at predetermined small intervals. These markings 2 are scanned by a light beam 3 which is focussed on the disc 1 by means of a lens system 4 and is derived from the fluorescent screen of a cathode ray tube 5 on which the spot of light is caused to travel in a fixed direction (which may be regarded as the vertical direction) along a straight scan line under the control of a time base unit 6 of known construction and arrangement.

The disc may be of transparent material (as in the example illustrated) so that the scanning light beam 3 may pass therethrough to impinge on an output photocell 7 from which an output is derived in the form of pulses representing binary numbers which can be transmitted to a remote location, and there interpreted in terms of angular position of the scanned disc 1. It will be understood, of course, that the disc 1 may be provided with a reflecting surface so that the scanning beam 3 is reflected back from the markings 2 to control a photocell located in front of the disc.

In order to obtain a high degree of accuracy in the data transmitted concerning the angular position of the disc 1, the magnitude of the least significant change of angle which is distinguished by the markings 2 must be kept to as small a value as possible. Since these markings, which are arranged in radial groups all around the scanned disc 1, represent numbers in the binary scale, a relatively large number of significant places are required in each radial group of markings representing a discrete angular position. The markings 2 must, therefore, be small if the size of the disc is to be kept within reasonable limits, and hence it is essential that the scanning beam 3 should be kept accurately aligned on a fixed scanning path so as to avoid errors due to wander of the beam for any cause, such as mechanical vibration of the apparatus or drift in the electrical circuits.

For this purpose, a half-silvered mirror 8 is interposed in the path of the beam 3 at such an angle as to reflect part of the beam along a path 3*a* to be focussed by a lens 9 on to a mask in the form of a straightedge 10 behind which is located a control photocell 11. The arrangement is such that when the scanning beam 3 is accurately aligned on the radial path on the disc 1 along which it is to travel, the control beam 3*a* derived from the half-silvered mirror 8 falls on the mask or straightedge 10 so as to partially illuminate the photocell 11. The output of this photocell under these conditions thus constitutes a "zero" or datum level. If now the beam 3 tends to wander from its true path, the control beam 3*a* will also deflect to a proportionate extent so as to vary the illumination of the control photocell 11 above or below the datum level. This variation in output is utilised to restore the position of the spot on the fluoroescent screen of the cathode ray tube 5.

The circuit can be arranged in any one of a large variety of ways according to the preferred technique in any individual case. Figs. 1 and 2 illustrate in block diagram form the principle of a simple self-correcting arrangement consisting of a high gain amplifier 12 whose output is fed to the lateral deflector plates 13 in the cathode ray tube 5. The output from this amplifier 12 is controlled by the control photocell 11 to constitute a negative feedback circuit whereby the necessary correcting potential is applied to the deflector plates 13 whenever the beam 3 wanders from its true path on the disc 1.

Fig. 4 shows an alternative circuit arrangement in which provision is made for deliberate deflection of the scanning beam 3 from its predetermined path across the face of the disc 1. Such provision may be required, for example, in cases where the markings 2 on the disc 1 represent a function—say $f(x)$—with which it is required to combine an independent variable $y$ to obtain the function $f(x+y)$. To achieve this, a potential proportional to the value of $y$ is applied when necessary to the deflecting plates 13 of the cathode ray tube 5 so that the light beam 3 is deflected from its normal path by an amount proportional to $y$, and the output derived from the output photocell 7 is then proportional to $f(x+y)$.

It is, however, desirable in such an arrangement to ensure that the function disc 1 is accurately scanned so that the value of $f(x)$ in the output is always correctly maintained. For this purpose, the potential corresponding to the independent variable $y$ is applied to the circuit of the deflector plates 13 through an adding circuit 14. When the value of $y$ is zero, the output from the photocell 7 is equal to $f(x)$, and any tendency for the scanning beam 3 to wander is corrected by the control photocell 11.

While the value of $y$ is not zero and a corresponding voltage is being applied to the deflector plates 13, pulses from the time base circuit 6 are fed to the high gain amplifier 12 which block or remove the control exercised by the photocell 11. In this way, deflection of the beam 3 due to the presence of the $y$ potential on the deflector plates 13 is not automatically compensated and the output from the photocell 7 is proportional to $f(x+y)$. At all other times, the feedback from the scan control photocell 11 ensures that the scan line on the disc 1 is accurately followed by the beam 3.

Figures 5, 6, 7, 8:
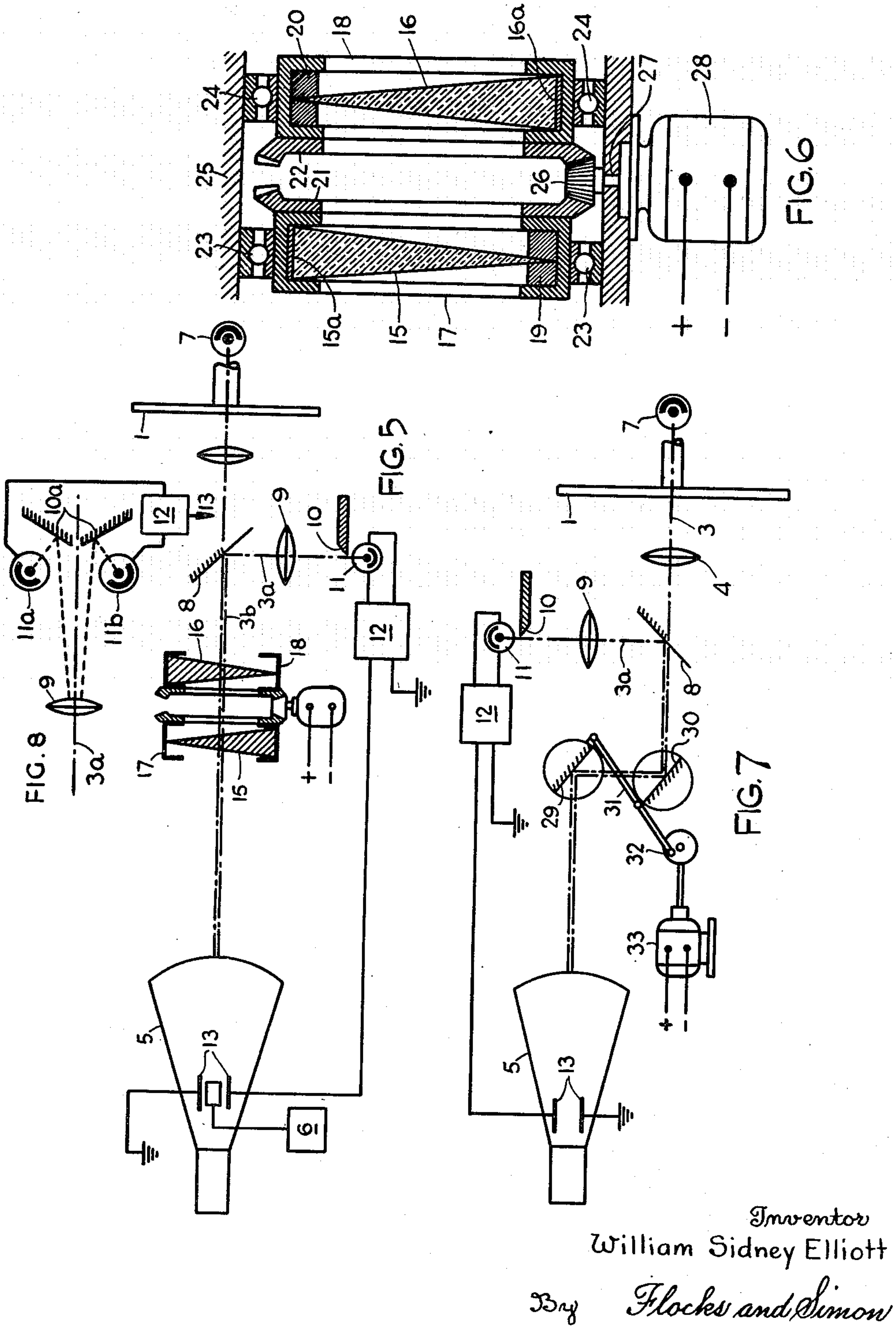
Fig. 6 shows part of Fig. 5 on a larger scale.
Figs. 7 and 8 show further alternative embodiments of the invention.

Figs. 5 and 6 illustrate another embodiment of the invention whereby the trace on the screen of the cathode ray tube 5 can be deliberately and continuously deflected whilst the scanning beam 3 is held accurately on the predetermined scan line on the function disc 1. The purpose of such an arrangement is to prevent local burning of the screen of the tube 5 to the continuous sweeping of the spot over the same trace area on the screen whilst adjacent screen areas remain untouched. The life of a cathode ray tube used as a scanning device is therefore materially increased.

To produce the desired effect, the scanning beam 3 is passed through a pair of optical wedges 15, 16 having their medial planes parallel and normal to the scanning beam. The peripheral edge of each of the wedges 15, 16 is cylindrical, and the wedges are positioned so that the axes of their cylindrical edges are coincident with the scanning beam 3. Each wedge is fixed in a respective rigid frame 17, 18, shown as of shallow channel section (Fig. 6) with its open side directed inwards. The internal width of the channel is such as to accommodate as a relatively close fit the maximum thickness of the wedge (indicated at 15*a*, 16*a* respectively in Fig. 6), the space between the side surfaces of each wedge and the adjacent inner side walls of the channel being filled by some suitable packing material such as a hard-setting cement or synthetic resin compound indicated at 19, 20 respectively. The frames 17, 18 may be split along a diameter to facilitate assembly.

To the one side of each frame 17, 18 is secured an annular bevel gear 21, 22 which is mounted coaxially with its associated frame, and the latter is mounted, as by a ball bearing 23, 24 respectively, in a common fixed cylindrical housing 25. The annular bevel gears 21, 22 mesh with a common bevel driving pinion 26 carried on the shaft 27 of a driving motor 28, so that rotation of the pinion 26 causes the gears 21, 22, and with them the wedges 15, 16, to rotate in opposite directions and at equal speeds about a common axis coincident with the mean position of the scanning beam 3.

Assuming that the spot on the screen of the cathode ray tube 5 is stationary, and that the apex angles of the optical wedges 15, 16 are equal, the emergent beam 3*b* (i. e., after passing through both wedges) will describe the surface of a cone coaxial with the incident beam. The scanning beam 3 thus tends to describe a circle on the disc 1, the diameter of which is determined by the apex angles of the wedges 15, 16, and its centre lying on the predetermined scan line on the disc.

The emergent beam is passed through a half-silvered mirror 8 to provide a scanning beam 3 and a control beam 3a, the latter being focussed on a straightedge 10 and control photocell 11 in similar manner to that shown in Figs. 1, 2 and 4. The control photocell 11 is arranged, as in these figures, to modify the output of the amplifier 12 so as to apply a correction voltage to the deflector plates 13 of the cathode ray tube 5, this correction voltage serving to shift the spot laterally (i. e., normal to the direction of the trace produced by the time base voltage applied to the Y-plates of the tube 5) by an amount equal and opposite to the lateral deflection of the beam 3 produced by the optical wedges 15, 16 during their rotation. The trace on the screen is thus bodily displaced across the screen in cyclic manner, and local burning of the screen is prevented. Furthermore, the accuracy of scanning of the disc 1 is independent of fluctuations in speed of the driving motor 28, the supply to which thus requires no special stabilisation.

Fig. 7 shows an alternative method of obtaining cyclic lateral deflection of the trace on the screen of the cathode ray tube 5. In this arrangement, a pair of mirrors 29, 30 are located close to each other in substantially parallel relation, the mirror 29 being set at approximately 45° to the direction of the beam from the cathode ray tube 5 whilst the mirror 30 is located to receive and reflect the light from the mirror 29 on to a half-silvered mirror 8. The mirrors 29, 30 are rotatable about axes parallel to the plane in which the beam 3 scans the disc 1, and are connected by a link 31 which is also coupled to a short throw crank 32 driven by an electric motor 33. The control beam 3a and associated apparatus 10, 11, 12 is arranged as in Figs. 1 and 2.

The operation of this embodiment is as follows: When the motor 33 is run, the mirrors 29, 30 oscillate through relatively small angles so that the scanning beam 3 tends to swing in a plane normal to its scanning plane. This causes the control photocell 11 to apply, through the amplifier 12, a correction potential to the deflector plates 13 of the cathode ray tube 5 which deflects the spot on the screen of the tube 5 transverse to its scanning deflection in a sense, and to an extent, such as to exactly compensate for the deliberate deflection produced by the oscillating mirrors 29, 30.

In the alternative arrangement shown in Fig. 8, the mask is constituted by an opaque plate 10a of shallow V-shape mounted convexly towards the source of the beam 3a and having a narrow slit 10b formed along the apex of the V to define the limits of the scan path. The flanks of the V-shaped plate 10a are silvered so as to reflect light impinging thereon from the half-silvered mirror 8 back at an angle to the incident control beam 3a, and a separate photocell 11a, 11b is arranged to be illuminated by light so reflected from each flank. A correction signal is thus derived which is of a sign corresponding to the direction of the control beam 3a. The V-shaped plate 10a may, if desired, be located in front of the disc 1 so that the slit 10b is parallel to the scan line. This arrangement avoids the necessity for splitting the beam from the cathode ray tube 5.

In all forms of the invention as applied to data transmission systems, one of two alternative conditions may be fulfilled as preferred. If the time constant of the correction circuit 11, 12 is small compared with the time of one cycle of the timing unit 6, continuous correction of the scanning beam is achieved at every point of the scanning sweep, and the scan line truly follows the predetermined path on the disc 1. On the other hand, if the said time constant is large, the mean position of the scan line will be accurately controlled. The latter arrangement is preferable where the system is arranged to derive a function of two variables—for example, as illustrated in Fig. 4 of the accompanying drawings.

What I claim is:

1. Means for stabilising upon a target a light beam subject to beam-disturbing influences, comprising a target, a source generating a light beam, means directing said beam on to said target, means periodically displacing said source along a given path such that, in the absence of said beam-disturbing influences, the beam will trace repeatedly on the target a desired path of a predetermined shape and constant length, a stationary mask, a light-absorbing area on said mask having an edge of said predetermined shape, means diverting part of said beam to said mask so that it will repeatedly travel along said edge thereon, while said influences are absent, with a fixed proportion of its light passing freely by said edge, any disturbance which causes the beam to deviate laterally on the target from said desired path resulting in movement of said diverted part of the beam transversely of said edge to vary the proportion of its light which passes the same, a light-sensitive device arranged to convert the light passing said edge into proportionate control signals, beam-deflecting means between the light source and the light-diverting means, and means for actuating the beam-deflecting means to cause it to tend to produce a constantly varying lateral deviation of the light beam from its desired path on the target, the resultant control signals derived from the light-sensitive device producing a compensatory distortion of said given path of the light-source which ensures that the light beam will continue to sweep said desired path.

2. Means for transmitting data comprising a target bearing optical markings representing the data to be transmitted, a source generating a light beam, means directing said beam on to said target, means periodically displacing said source along a given path such that in the absence of beam-disturbing influences the beam will trace repeatedly on the target a desired path of a predetermined shape and constant length, a light-sensitive device disposed to receive the light beam as modulated by the markings on the target, means for transmitting the resultant output of said device, a stationary mask, a light absorbing area on said mask having an edge of said predetermined shape, means diverting part of the unmodulated beam to said mask so that it will repeatedly travel along said edge thereon, while said influences are absent, with a fixed proportion of its light passing freely by said edge, any disturbance which causes the beam to deviate laterally on the target from said desired path resulting in movement of said diverted part of the beam transversely of said edge to vary the proportion of its light which passes the same, a second light-sensitive device arranged to convert the light passing said edge on the mask into proportionate control signals, beam deflecting means between the light source and the light diverting means, and means for actuating the beam-deflecting means to cause it to tend to produce a constantly varying lateral deviation of the light beam from its desired path on the target, the resultant control signals derived from the second light-sensitive device producing a compensatory distortion of said given path of the light-source which ensures that the light beam will continue to sweep said desired path.

3. Means for transmitting data as claimed in claim 2, in which the light source is a bright spot produced on the fluorescent screen of a cathode ray tube by the cathode ray therein.

WILLIAM S. ELLIOTT.

References Cited in the file of this patent

UNITED STATES PATENTS

| Number | Name | Date |
|---|---|---|
| 2,415,190 | Rajchman | Feb. 4, 1947 |
| 2,415,191 | Rajchman | Feb. 4, 1947 |
| 2,455,532 | Sunstein | Dec. 7, 1948 |
| 2,462,263 | Haynes | Feb. 22, 1949 |
| 2,528,020 | Sunstein | Oct. 31, 1950 |